United States Patent
Doerr

(10) Patent No.: US 11,543,728 B2
(45) Date of Patent: Jan. 3, 2023

(54) HIGH-GAIN DIFFERENTIAL ELECTRO-OPTIC MODULATOR

(71) Applicant: Aloe Semiconductor Inc., Irvine, CA (US)

(72) Inventor: Christopher R. Doerr, Irvine, CA (US)

(73) Assignee: Aloe Semiconductor Inc., Irvine, CA (US)

( * ) Notice: Subject to any disclaimer, the term of this patent is extended or adjusted under 35 U.S.C. 154(b) by 0 days.

(21) Appl. No.: 17/226,730

(22) Filed: Apr. 9, 2021

(65) Prior Publication Data

US 2022/0326586 A1    Oct. 13, 2022

(51) Int. Cl.
*G02F 1/225*  (2006.01)
*G02F 1/21*   (2006.01)

(52) U.S. Cl.
CPC ............ *G02F 1/2257* (2013.01); *G02F 1/212* (2021.01); *G02F 1/2255* (2013.01)

(58) Field of Classification Search
CPC ....... G02F 1/2257; G02F 1/212; G02F 1/2255
See application file for complete search history.

(56) References Cited

U.S. PATENT DOCUMENTS

| | | | | |
|---|---|---|---|---|
| 9,235,068 B2 * | 1/2016 | Manouvrier | .......... | G02F 1/2257 |
| 9,625,746 B2 * | 4/2017 | Chen | ....................... | G02F 1/025 |
| 10,554,014 B1 * | 2/2020 | Doerr | .................... | H01S 3/1062 |

OTHER PUBLICATIONS

J. Witzens, "High-Speed Silicon Photonics Modulators," in Proceedings of the IEEE, dated Dec. 2018, 106(12):2158-2182.
Doerr et al., "Silicon Photonics in Optical Coherent Systems," Proceedings of the IEEE, dated Dec. 2018, 106(12):2291-2301.
Liow et al., "Silicon modulators and germanium photodetectors on SOI: monolithic integration, compatibility, and performance optimization," IEEE Journal of Selected Topics in Quantum Electronics, dated 2010, 16(1):307-315.
M. Webster et al., "An efficient MOS-capacitor based silicon modulator and CMOS drivers for optical transmitters," 11th International Conference on Group IV Photonics (GFP), Paris, dated 2014, 2 pages.

* cited by examiner

*Primary Examiner* — John Bedtelyon
(74) *Attorney, Agent, or Firm* — Fish & Richardson P.C.

(57) ABSTRACT

An optical modulator includes a Mach-Zehnder interferometer including (i) a first optical waveguide including a first semiconductor junction diode, and (ii) a second optical waveguide including a second semiconductor junction diode. A semiconductor region connects the first and second semiconductor junction diodes such that a distance between the first and second optical waveguides is less than 2.0 µm for at least a portion of a longitudinal direction of the optical modulator. In another aspect, a method of modulating an optical signal includes splitting input light into first and second optical transmission paths; modulating a phase difference between light in the first optical transmission path and light in the second optical transmission path without applying a bias voltage through an impedance less than 100 ohm between the first and second optical transmission paths; and combining light that is output from the first and second optical transmission paths.

20 Claims, 14 Drawing Sheets

HIGH-GAIN DIFFERENTIAL ELECTRO-OPTIC MODULATOR

TECHNICAL FIELD

The present disclosure generally relates to electro-optic differential modulators.

BACKGROUND

In optical communication systems, electro-optic modulators provide a fundamental mechanism of modulating optical waveforms to carry information. In general, electro-optical modulators operate by modifying one or more properties of optical waveforms according to information, such as digital data, provided by electrical signals.

SUMMARY

Implementations of the present disclosure are generally directed to electro-optic differential modulators.

One general aspect includes an optical modulator including: a Mach-Zehnder interferometer including (i) a first optical waveguide including a first semiconductor junction diode, and (ii) a second optical waveguide including a second semiconductor junction diode. The optical modulator also includes a semiconductor region that connects the first semiconductor junction diode with the second semiconductor junction diode, such that a distance between the first optical waveguide and the second optical waveguide is less than 2.0 µm for at least a portion of a longitudinal direction of the optical modulator.

Implementations may include one or more of the following features. The optical modulator where the first semiconductor junction diode includes a first anode and a first cathode, and where the second semiconductor junction diode includes a second anode and a second cathode. The optical modulator where the first anode is connected to the second anode through the semiconductor region that spans the distance between the first optical waveguide and the second optical waveguide. The optical modulator where the semiconductor region between the first anode and the second anode is configured without any external voltage connection that has an impedance less than 100 ohm. The optical modulator further including: a first electrode connected to the first cathode and configured to apply a first electric field to the first optical waveguide. The optical modulator may also include a second electrode connected to the second cathode and configured to apply a second electric field to the second optical waveguide. The optical modulator further including: a radio frequency (RF) transmission line configured to apply (i) a first voltage to the first cathode through a first electrode, and (ii) a second voltage to the second cathode through a second electrode. The optical modulator where the first optical waveguide includes a plurality of first semiconductor junction diodes, and where the second optical waveguide includes a plurality of second semiconductor junction diodes. The optical modulator where the RF transmission line is configured to (i) apply the first voltage to the plurality of first semiconductor junction diodes through a plurality of first electrodes, and (ii) apply the second voltage to the plurality of second semiconductor junction diodes through a plurality of second electrodes. The optical modulator where for a first portion of the optical modulator, the first optical waveguide is wider by at least 0.04 µm than the second optical waveguide, and where for a second portion of the optical modulator, the second optical waveguide is wider by at least 0.04 µm than the first optical waveguide. The optical modulator where for at least a portion of the optical modulator: the first optical waveguide increases in width along the longitudinal direction of the optical modulator, and the second optical waveguide decreases in width along the longitudinal direction of the optical modulator. The optical modulator where the first semiconductor junction diode includes a first p-doped region and a first n-doped region, and where the second semiconductor junction diode includes a second p-doped region and a second n-doped region. The optical modulator where the first p-doped region is connected to the second p-doped region through a third p-doped region in the semiconductor region that connects the first semiconductor junction diode with the second semiconductor junction diode. The optical modulator where the third p-doped region is configured without any external voltage connection that has an impedance less than 100 ohm. The optical modulator where the first semiconductor junction diode further includes a first oxide layer between the first p-doped region and the first n-doped region, and where the second semiconductor junction diode further includes a second oxide layer between the second p-doped region and the second n-doped region. The optical modulator where the Mach-Zehnder interferometer further includes: an optical splitter configured to receive input light and split the input light into the first optical waveguide and the second optical waveguide. The optical modulator may also include an optical combiner configured to receive first output light from the first optical waveguide and second output light from the second optical waveguide, and combine the first output light with the second output light. The optical modulator where the distance between the first optical waveguide and the second optical waveguide is the distance between an inner sidewall of the first optical waveguide and an inner sidewall of the second optical waveguide.

Another general aspect includes an optical modulator including: an optical splitter configured to split an input light into a first optical transmission path and a second optical transmission path. The optical modulator also includes means for modulating a phase difference between light in the first optical transmission path and light in the second optical transmission path without applying a bias voltage through an impedance less than 100 ohm between the first optical transmission path and the second optical transmission path. The optical modulator also includes an optical combiner configured to combine light that is output from the first optical transmission path and light that is output from the second optical transmission path.

Implementations may include one or more of the following features. The optical modulator further including: a radio frequency (RF) transmission line configured to apply (i) a first voltage to the first optical transmission path through a first electrode, and (ii) a second voltage to the second optical transmission path through a second electrode. The optical modulator where the first optical transmission path includes a first semiconductor junction diode, the second optical transmission path includes a second semiconductor junction diode, and the first semiconductor junction diode is just below turn-on while the second semiconductor junction diode is at maximum reverse voltage during modulation. The optical modulator where the phase difference between the light in the first optical transmission path and the light in the second optical transmission path is modulated by applying a first electric field to the first optical transmission path and a second electric field to the second optical transmission path in push-pull mode. The optical modulator where the phase difference between the light in the first optical transmission path and the light in the second optical transmission path is modulated while maintaining finite depletion regions in semiconductor junction diodes in each of the first optical transmission path and the second optical transmission path.

Another general aspect includes a method of modulating an optical signal, the method including: splitting input light into a first optical transmission path and a second optical transmission path. The method of modulating also includes modulating a phase difference between light in the first optical transmission path and light in the second optical transmission path without applying a bias voltage through an impedance less than 100 ohm between the first optical transmission path and the second optical transmission path. The method of modulating also includes combining light that is output from the first optical transmission path and light that is output from the second optical transmission path.

Implementations may include one or more of the following features. The method where the phase difference between the light in the first optical transmission path and the light in the second optical transmission path is modulated while maintaining finite depletion regions in semiconductor junction diodes in each of the first optical transmission path and the second optical transmission path.

Another general aspect includes an optical modulator that includes a Mach-Zehnder interferometer including (i) a first optical waveguide comprising a first semiconductor junction diode, and (ii) a second optical waveguide comprising a second semiconductor junction diode. The optical modulator also includes a semiconductor region that connects a terminal of the first semiconductor junction diode with a terminal of the second semiconductor junction diode. The terminal of the first semiconductor junction diode and the terminal of the second semiconductor junction diode are either both p-doped anodes or both n-doped cathodes. The semiconductor region is not connected to any other circuit element through an impedance less than 100 ohm.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Systems and techniques are disclosed herein that provide a novel differential electro-optic modulator which can achieve a significantly higher modulation bandwidth and/or efficiency. This is accomplished by novel implementations which enable significant reduction in the physical distance between waveguides of the modulator. In some implementations, the reduced physical distance between the waveguides is achieved by removing a bias voltage connection between semiconductor junction diodes of waveguides of the modulator, while maintaining finite depletion regions in the semiconductor junction diodes. The reduced physical distance between the diodes, in turn, enables significantly reduced electrical resistance between the diodes, which increases the modulation bandwidth and/or efficiency of the modulator. In some implementations, to mitigate detrimental optical coupling that may occur between the closely-spaced waveguides, the waveguides have widths that vary in an alternating manner along the length of the modulator.

Figure 1:
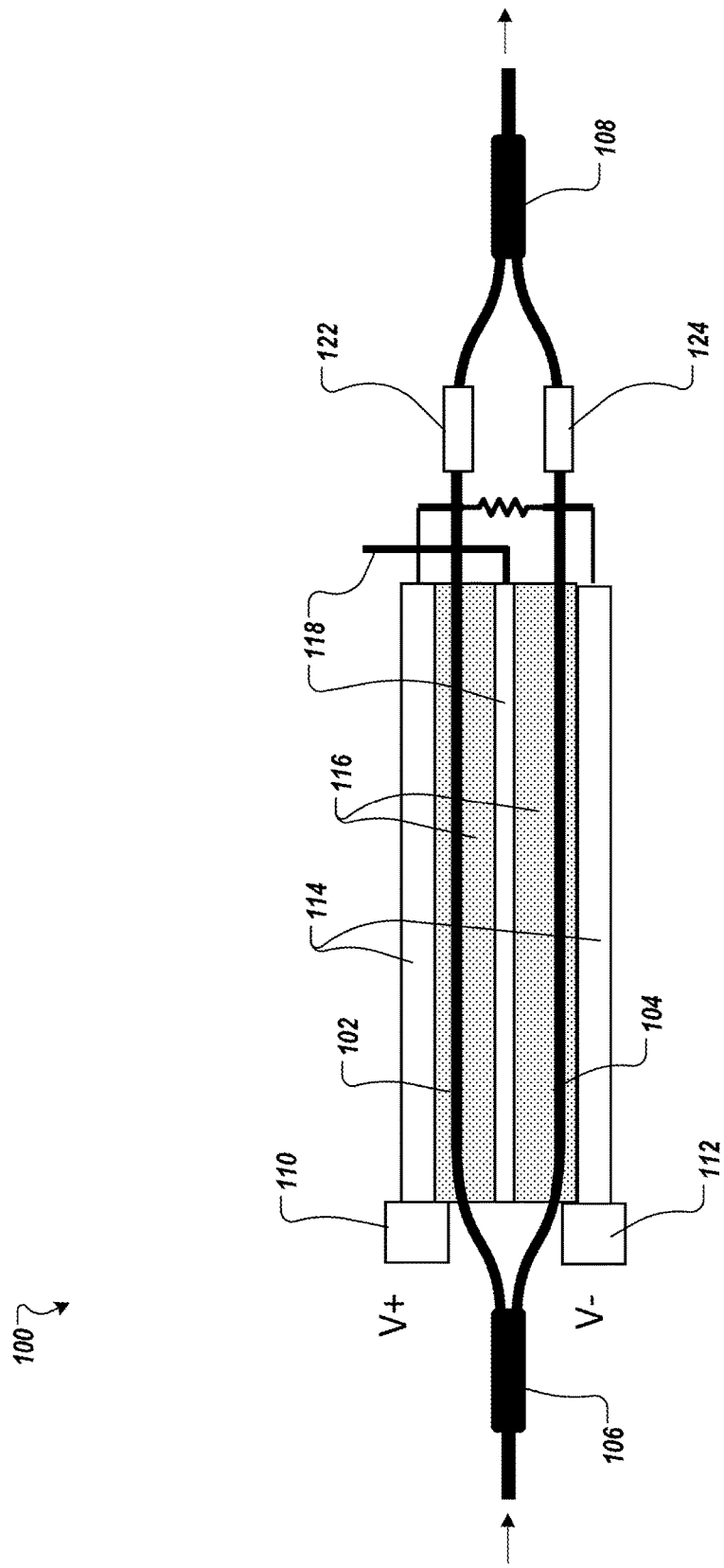
FIG. 1 illustrates an example of a top view of a differential modulator which implements a bias voltage connection between the waveguides.

FIG. 1 illustrates an example of a top view of a differential modulator 100 which implements a bias voltage connection between the waveguides. This example is provided for comparison with modulators according to implementations of the present disclosure which are described further below with reference to FIGS. 5-14.

The modulator 100 is based on a Mach-Zehnder interferometer (MZI) implementation, in which optical signals propagate along the length of the modulator 100 (e.g., from left to right in FIG. 1) along two optical transmission paths 102 and 104. At the input of modulator 100, optical splitter 106 splits an input light into the two optical transmission paths 102 and 104. At the output of the modulator 100, the optical combiner 108 combines light output from the two optical transmission paths 102 and 104. The optical splitter 106 and the optical combiner 108 may be implemented in various ways, for example, using symmetric, asymmetric, or tunable optical intensity couplers. The optical transmission paths 102 and 104 can be implemented by waveguides formed in a semiconducting structure 116, as described in further detail with reference to FIG. 2, below. In some implementations, the optical cores of the waveguides, and/or the optical splitter 106, and/or the optical combiner 108 can include silicon ribs.

The modulator 100 uses a travelling wave configuration in which voltages applied at terminals 110 and 112 create an electrical signal that propagates along a radio frequency (RF) transmission line 114, which is terminated at an RF termination resistance. The electrical signal in RF transmission line 114 travels at the same speed as and induces electro-optic modulation in the light that propagates along the two optical transmission paths 102 and 104. In particular, the RF transmission line 114 is connected to the semiconducting structure 116 via electrodes (described in further detail with reference to FIG. 2, below), that apply respective voltages, and resulting electric fields, across one or both of the optical transmission paths 102 and 104. The applied voltage(s) induce a phase shift in the light that propagates in one or both of the optical transmission paths 102 and 104. In some implementations, the phase shift is differential in that the phase shift magnitude is equal and the phase shift sign is opposite between the optical transmission paths 102 and 104.

Electro-optic modulation is achieved by varying the voltage at one or both of the terminals 110 and 112 to modulate the differential phase shift between the phase of light in the first optical transmission path 102 and the phase of light in the second optical transmission path 104. For example, if the terminal voltages are controlled such that the differential phase shift causes destructive interference at the optical combiner 108, then this corresponds to an "off" or logic "0" state of the modulator 100. By contrast, if the terminal voltages are controlled such that the differential phase shift between the two optical transmission paths 102 and 104 causes constructive interference at the optical combiner 108, then this corresponds to the "on" or logic "1" state of the modulator 100.

The differential phase shift between the two optical transmission paths 102 and 104 can also be influenced by other factors. For example, the physical lengths of the optical transmission paths 102 and 104 can be the same to provide zero inherent differential phase shift, or can be different lengths to provide non-zero inherent differential phase shift. Furthermore, in some implementations, direct current (DC) phase shifters 122 and 124 (e.g., thermo-optic phase-shifters, such as optical waveguide heaters), may be implemented near the ends of the optical transmission paths 102 and 104 to control the relative phases of the two light signals before being combining in the optical combiner 108.

In some implementations, the phase modulation can be performed by a "push-pull" mechanism, in which the phases of light in both of optical transmission paths 102 and 104 are modulated, to control the relative phase shift between the two paths. In push-pull operation, the voltage V+ at terminal 110 is increased and voltage V− at terminal 112 is decreased (or vice versa), resulting in corresponding phase shifts of light in each of the optical transmission paths 102 and 104. Push-pull modulation can provide various advantages over non-push-pull modulation, such as achieving smaller average energy consumption and reduced chirp in the modulated signal.

In some scenarios, a direct current (DC) bias connection 118 can be connected between the two optical transmission paths 102 and 104. The DC bias connection 118 is implemented such that semiconductor junction diodes in each of the optical transmission paths 102 and 104 remain reverse biased, even when data signals applied at the terminals 110 and 112 vary between logical 1 and logical 0. Further details of the DC bias connection 118 and the semiconductor junction diodes are provided with reference to FIG. 2, below.

Figure 2:
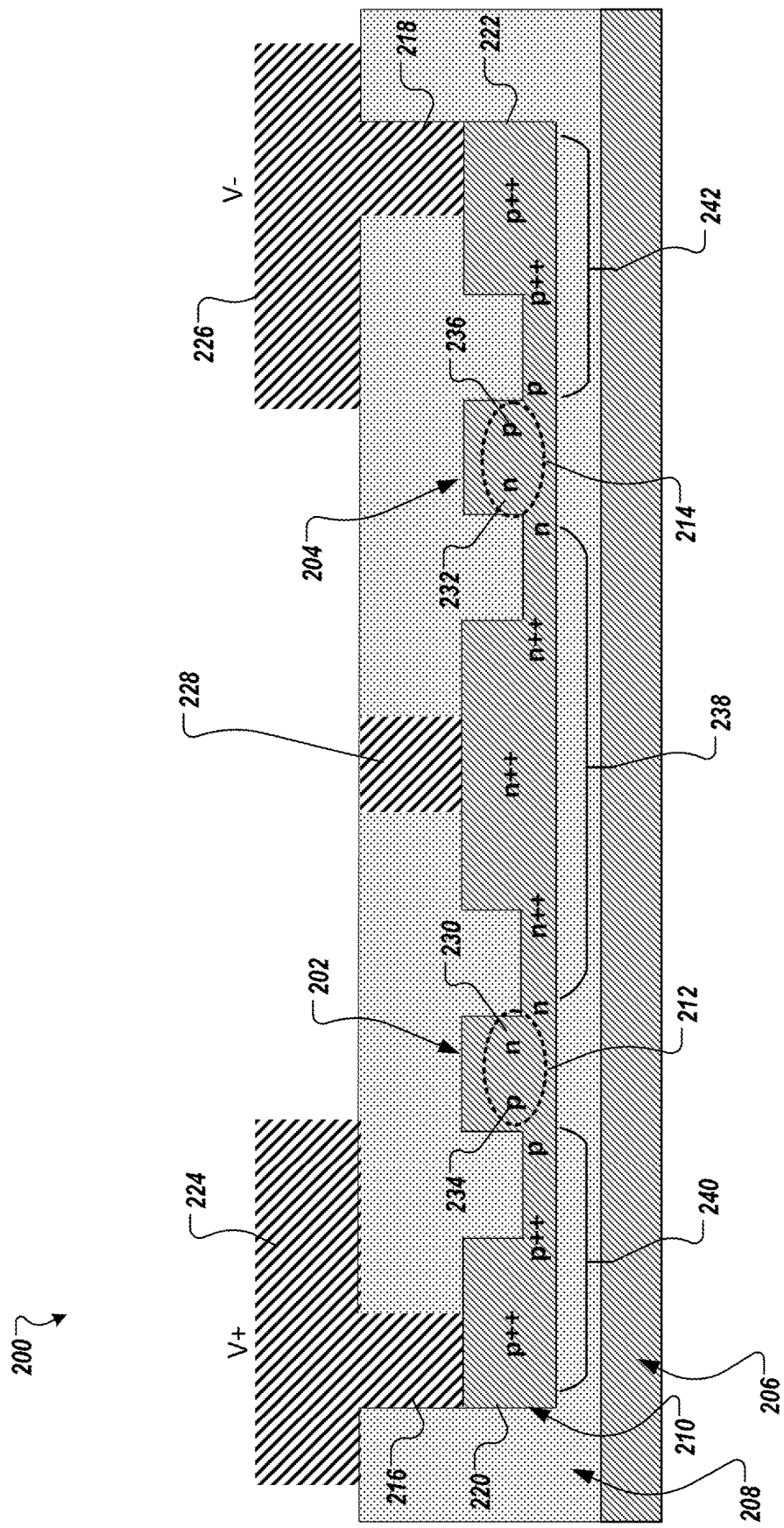
FIG. 2 illustrates an example of a cross section of a modulator which implements a bias voltage connection between the waveguides.

FIG. 2 illustrates an example cross section of a modulator 200 which implements a bias voltage connection between the waveguides (e.g., the modulator 100 of FIG. 1). This example is provided for comparison with modulators according to implementations of the present disclosure which are described further below with reference to FIGS. 5-14.

The cross-section of modulator 200 shows details of the MZI structure. The MZI includes a first optical waveguide 202 and a second optical waveguide 204. The optical waveguides 202 and 204 can be implemented, for example, as silicon ribbed waveguides on top of a slab. In some implementations, the modulator 200 includes a substrate 206 (e.g., a silicon substrate) an insulating structure 208 (e.g., a dielectric, such as an oxide), and a semiconducting structure 210 (e.g., a silicon layer which includes optical waveguides 202 and 204).

Each of the optical waveguides 202 and 204 includes a semiconductor junction. The semiconductor junction diodes can be implemented, for example, by a PIN (P-type/intrinsic/N-type) junction diode or a P/N junction diode. In modulator 200, a P/N junction is implanted into each of the optical waveguides 202 and 204, forming a diode in each waveguide. These diodes are shown as first semiconductor junction diode 212 and second semiconductor junction diode 214.

The modulator 200 also includes electrodes 216 and 218 (e.g., metal electrodes) which are in physical contact with the silicon layer 210. In some implementations, the electrodes 216 and 218 are in physical contact with P-doped contact regions 220 and 222 of the silicon layer 210. The electrodes 216 and 218 may be formed, for example, by etching the insulator layer 208 and forming metal (e.g., tungsten, copper, and/or aluminum) contacts.

The modulator 200 may also include metal layers 224 and 226 on top of the electrodes 216 and 218. In some implementations, the metal layers 224 and 226 may form segments of an RF transmission line (e.g., RF transmission line 114 in FIG. 1).

In some scenarios, a DC bias connection 228 is implemented between the two optical waveguides 202 and 204. The DC bias connection 228 ensures that the semiconductor junction diodes 212 and 214 remain reverse biased during modulation. For example, in a push-pull mode of modulation, a differential voltage (e.g., V+ and V−) is applied at the metal layers 224 and 226 (and hence at electrodes 216 and 218). If the voltage (e.g., V+) at first electrode 216 is increased while the voltage (e.g., V−) at the second electrode 218 is decreased, then a width of the depletion region in the first optical waveguide 202 decreases while a width of the depletion region in the second optical waveguide 204 increases (and vice versa). As the depletion widths change, this changes the effective refractive index experienced by the light traveling along each of the optical waveguides 202 and 204, resulting in corresponding phase shifts of the light. As a result, push-pull modulation can be achieved in the modulator 200.

In the example of modulator 200, the DC bias connection 228 is applied at the cathodes 230 and 232 (N-doped regions) of the semiconductor junction diodes 212 and 214, while the varying voltages V+ and V− are applied at the anodes 234 and 236 (P-doped regions) of the semiconductor junction diodes 212 and 214. The DC bias connection 228 ensures that the semiconductor junction diodes 212 and 214 remain reverse biased. For example, in the example of modulator 200, if the bias voltage applied at the DC bias connection 228 is very low (or non-existent), then this may result in activation of the first semiconductor junction diode 212 (e.g., forward bias above 0.6 V for silicon) with a significant number of carriers injected into the depletion region of the first semiconductor junction diode 212, resulting in forward bias and slower operation. Implementing the DC bias connection 228 with a sufficiently large bias voltage ensures that the semiconductor junction diodes 212 and 214 remain reverse biased under modulation.

However, the structure of modulator 200 results in various limitations on modulation performance. In particular, the structure of modulator 200 results in significant electrical series resistance in various regions of the modulator 200.

In particular, the presence of DC bias connection 228 increases the physical distance of the semiconducting (e.g., silicon) region 238 between the semiconductor junction diodes 212 and 214. This results in significant electrical series resistance in the semiconducting region 238 that connects the semiconductor junction diodes 212 and 214. Furthermore, typical techniques to reduce such electrical series resistance, such as increasing the silicon doping of the semiconducting structure, can have other negative consequences such as increasing optical absorption.

Furthermore, the semiconducting regions 240 and 242 (which connect each of semiconductor junction diodes 212 and 214 with their respective electrodes 216 and 218) are P-doped semiconducting material, which has higher resistance than N-doped semiconducting material (for the same optical absorption). This results in significant electrical series resistance in the semiconducting regions 240 and 242 between electrodes 216 and 218 and the semiconductor junction diodes 212 and 214.

Consequently, the total electrical series resistance between electrodes 216 and 218 can significantly attenuate the voltage along the modulator 200 due to charging and discharging of the diode capacitance. Furthermore, this attenuation typically increases as modulation frequency increases. The resulting RF loss along the modulator 200 can detrimentally impact the bandwidth of the modulator 200.

Figure 3:
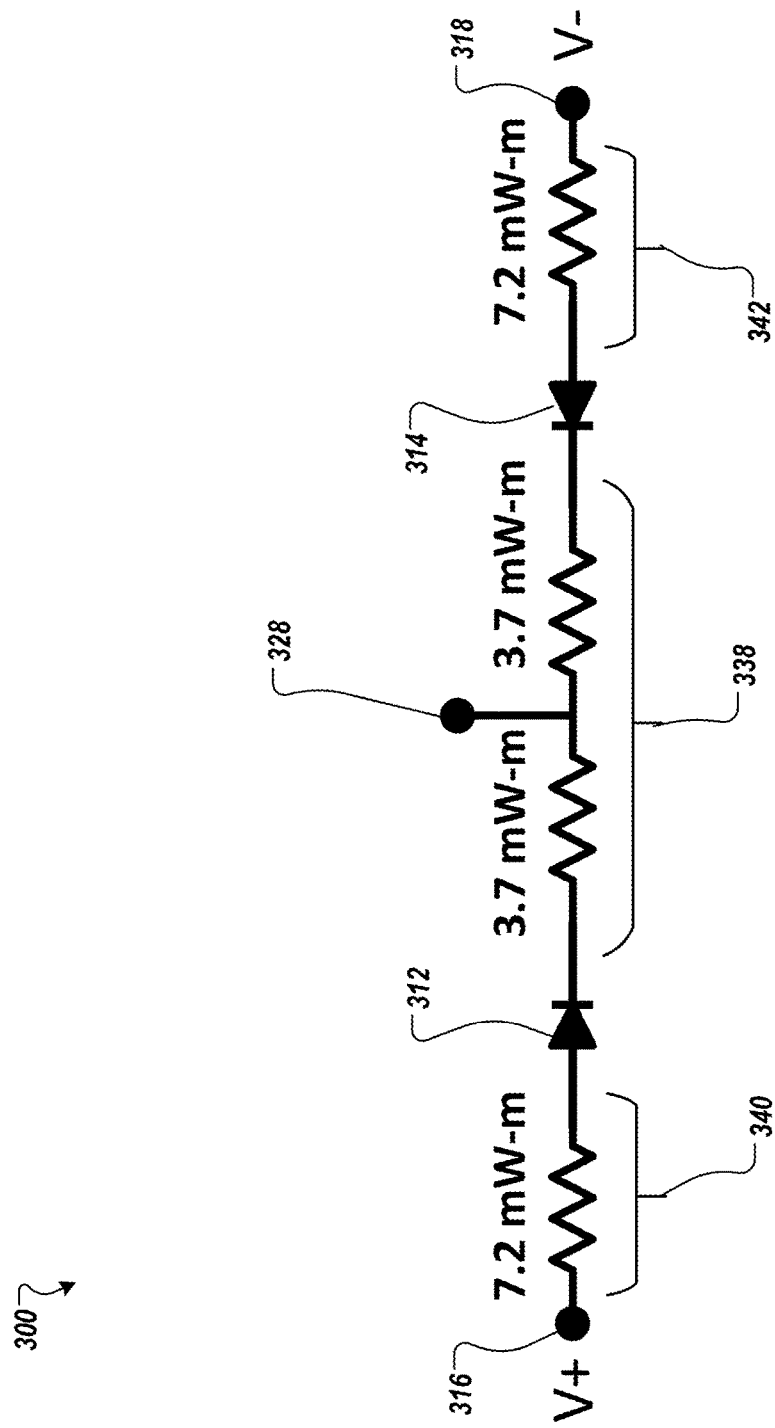
FIG. 3 illustrates an example of an equivalent circuit along a cross-section of a modulator which implements a bias voltage connection between the waveguides.

FIG. 3 illustrates an example equivalent circuit 300 along a cross-section of a modulator which implements a bias voltage connection between the waveguides (e.g., the cross section of modulator 200 of FIG. 2). This example is provided for comparison with modulators according to implementations of the present disclosure which are described further below with reference to FIGS. 5-14.

In the example of FIG. 3, the electrical series resistance 340 between first electrode 316 and first semiconductor junction diode 312 (e.g., corresponding to semiconducting region 240 in FIG. 2) is 7.2 mΩ-m. The electrical series resistance 342 between second electrode 318 and second semiconductor junction diode 314 (e.g., corresponding to semiconducting region 242 in FIG. 2) is 7.2 mΩ-m. The electrical series resistance 338 between semiconductor junction diodes 312 and 314 (e.g., corresponding to semiconducting region 238 in FIG. 2) is 7.4 mΩ-m (with 3.7 mΩ-m of series resistance between each of semiconductor junction diodes 312 and 314 and DC bias voltage connection 328).

Figure 4:
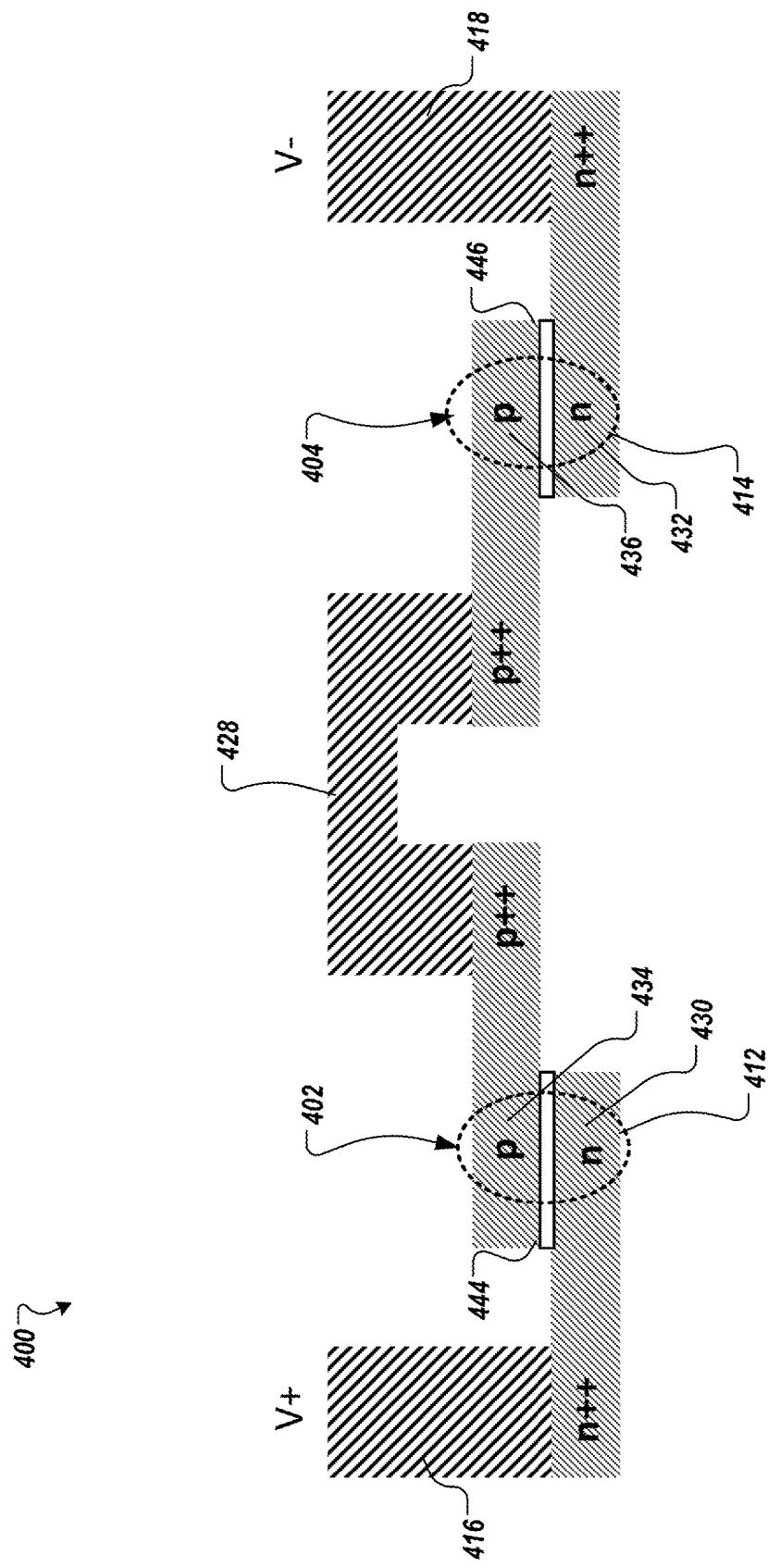
FIG. 4 illustrates another example of a cross section of a modulator which implements a bias voltage connection between the waveguides.

FIG. 4 illustrates another example of a cross section of a modulator 400 which implements a bias voltage connection between the waveguides (e.g., another example of a cross section of modulator 100 of FIG. 1). This example is provided for comparison with modulators according to implementations of the present disclosure which are described further below with reference to FIGS. 5-14.

The structure of modulator 400 is referred to as a silicon-insulator-silicon capacitor (SISCAP) modulator structure. As compared with modulator 200 of FIG. 2, the modulator 400 implements thin oxide layers 444 and 446 in the semiconductor junction diodes 412 and 414 of optical waveguides 402 and 404. Furthermore, in modulator 400, the DC bias connection 428 applies a bias voltage at the anodes 434 and 436 (P-doped regions) of semiconductor junction diodes 412 and 414, while the electrodes 416 and 418 apply varying voltages at the cathodes 430 and 432 (N-doped regions) of semiconductor junction diodes 412 and 414. The DC bias connection 428 ensures that the semiconductor junction diodes 412 and 414 remain reverse biased.

FIGS. 5-14 relate to modulators according to implementations of the present disclosure. In contrast with the modulators of FIGS. 1-4, the modulators of FIGS. 5-14 do not implement any bias voltage connection between the waveguides, resulting in significantly smaller series resistance between electrodes, and thus higher bandwidth of modulation. Furthermore, in FIGS. 5-14, the modulators implement waveguide structures that vary in width so as to mitigate detrimental optical coupling between the closely-spaced waveguides.

Figure 5:
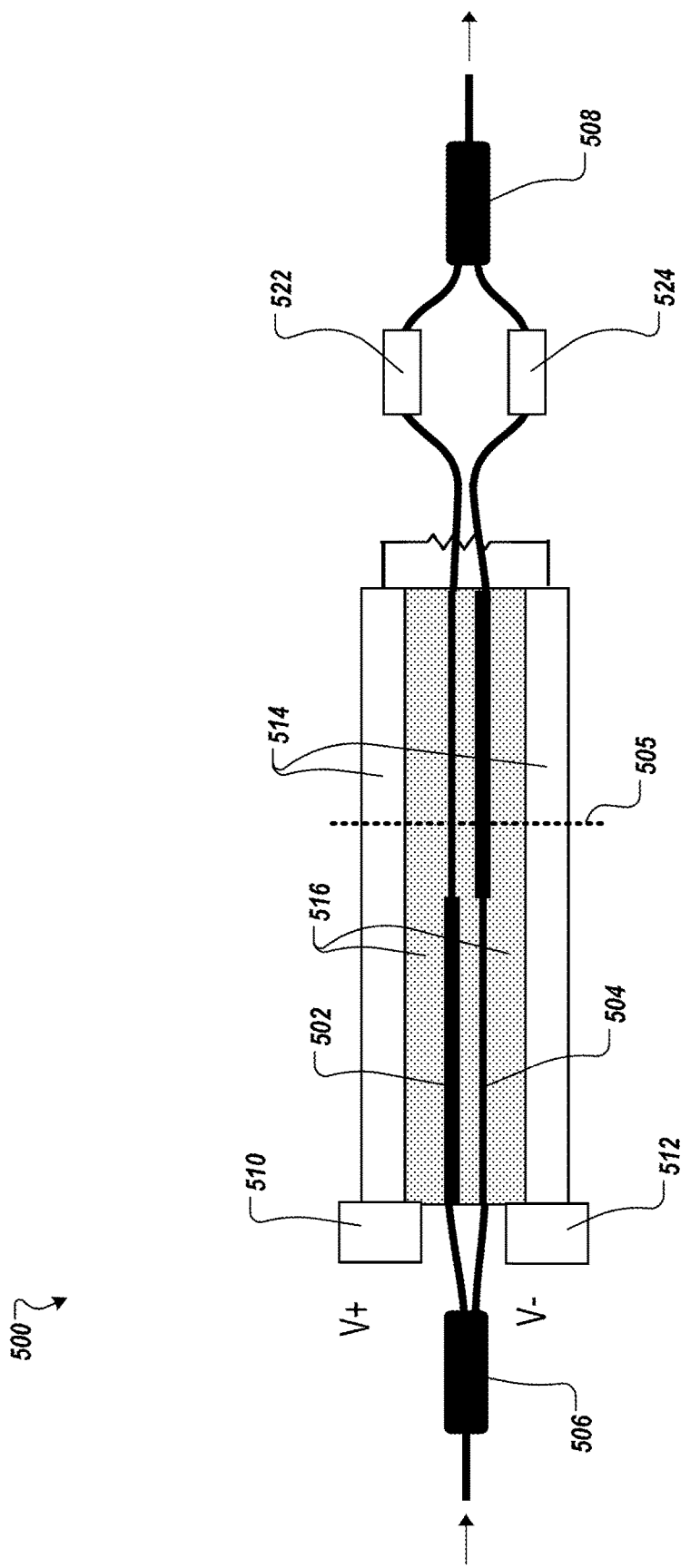
FIG. 5 illustrates an example of a top view of a modulator, according to implementations of the present disclosure.

FIG. 5 illustrates an example of a top view of a modulator 500 according to implementations of the present disclosure.

The modulator 500 is based on an MZI implementation which includes two optical transmission paths 502 and 504, optical splitter 506, and optical combiner 508. The modulator 500 further includes terminals, such as terminal 510 and terminal 512, through which voltages can be applied. The voltages travel along RF transmission line 514, which is connected to semiconducting structure 516 via electrodes that apply respective voltages, and resulting electric fields, across one or both of the optical transmission paths 502 and 504.

In contrast to the modulator 100 of FIG. 1, the modulator 500 does not implement any DC bias connection between the two optical transmission paths 502 and 504. This enables the two optical transmission paths 502 and 504 to be more closely-spaced together, thus reducing electrical series resistance therebetween. For example, in some implementations, the distance between the waveguides of the two optical transmission paths 502 and 504 is less than 0.5 µm for at least a portion of the longitudinal direction of the optical transmission paths 502 and 504. In some implementations, the distance between the waveguides is less than 2.0 µm for at least a portion of the longitudinal direction of the optical transmission paths 502 and 504. In some implementations, the distance between the waveguides is within a range of 0.1 µm to 2.0 µm for at least a portion of the longitudinal direction of the optical transmission paths 502 and 504. In some implementations, the distance between the waveguides is defined as the distance between the inner sidewalls of the two waveguides, at a given point along a longitudinal direction of the modulator 500 (e.g., at a point 505 in FIG. 5).

However, because the two optical transmission paths 502 and 504 are more closely spaced, there is risk of more significant detrimental optical coupling between light in optical transmission path 502 and light in optical transmission path 504. To mitigate such optical coupling, in some implementations, the waveguide of one of the optical transmission paths (502 or 504) is designed to have a larger width than the other path, at the same distance along the length of the modulator 500. This helps ensure that the light traveling in the waveguides of optical transmission paths 502 and 504 are not phase matched, thus mitigating optical coupling between the two waveguides. An alternative way to understand the importance of using different waveguide widths is to look at the two eigenmodes of the coupled waveguides of optical transmission paths 502 and 504. If the waveguides have equal widths, then the lowest order eigenmode is the even eigenmode, and the second lowest eigenmode is the odd eigenmode. In such a scenario, no differential modulation can occur. However, if one waveguide is sufficiently wider than the other, then the lowest order eigenmode consists of light that is predominantly in the wider waveguide, and the second lowest eigenmode is predominantly in the narrower waveguide. This enables differential modulation to occur despite the closely-spaced waveguides. For example, in some implementations, the waveguide of the one of the optical transmission paths 702 or 704 is wider by at least 0.04 µm than the waveguide of the other optical transmission path. In some implementations, the waveguide width difference is within a range of 0.04 µm to 0.4 µm.

Furthermore, in such implementations, the width variation of the two waveguides may be exchanged along the modulator 500, to help ensure that the total length of the wider portions in each waveguide are equal, and also that the total length of the narrower portions in each waveguide are equal. In the example of FIG. 5, moving from the left to right, the waveguide of first optical transmission path 502 is wider than the waveguide of the second optical transmission path 504, and then becomes narrower than the waveguide of the second optical transmission path 504 (alternatively, the first optical transmission path 502 may start narrower and become wider). The example of FIG. 5 shows one width swap in the middle of modulator 500, but in some implementations, additional width swaps can be included. Further details of the width variations of the waveguides will be discussed in reference to FIG. 7, below.

Although the description of FIG. 5, above, provided an example of a modulator 500 with variable-width waveguides in the two optical transmission paths 502 and 504, in other implementations, the waveguides may have constant width along the length of the modulator 500.

Furthermore, although the description of FIG. 5 provided an example of a modulator 500 without a physical DC bias connection, in some implementations, a DC bias connection may be implemented between the two optical transmission paths 502 and 504, but through a high impedance. For example, in some implementations, the high impedance is achieved with an impedance greater than 1 kohm. As another example, in some implementations, the high impedance is achieved with an impedance greater than 100 ohm. In such scenarios of a DC bias connection through a high impedance, a current would be generated by the voltage difference between (i) the external voltage and (ii) the voltage that would be between the optical transmission paths 502 and 504 if there were no applied external voltage. This generated current would be less than the diode leakage current plus any photo-generated current in the diodes, and thus the circuit would act primarily as if there were no applied external DC bias voltage (e.g., similar to a true floating voltage). Therefore, it should be appreciated that implementations of the present disclosure, such as those shown in FIGS. 5-10 in which there is no physical DC bias connection, can also be implemented with a DC bias connection but through a high impedance.

The modulator 500 implements an example of a continuous traveling-wave structure, in which the RF transmission line 514 is continuously connected to the semiconducting structure 516. Alternatively, a segmented traveling-wave structure can be implemented, as described with reference to FIG. 6, below.

Figure 6:
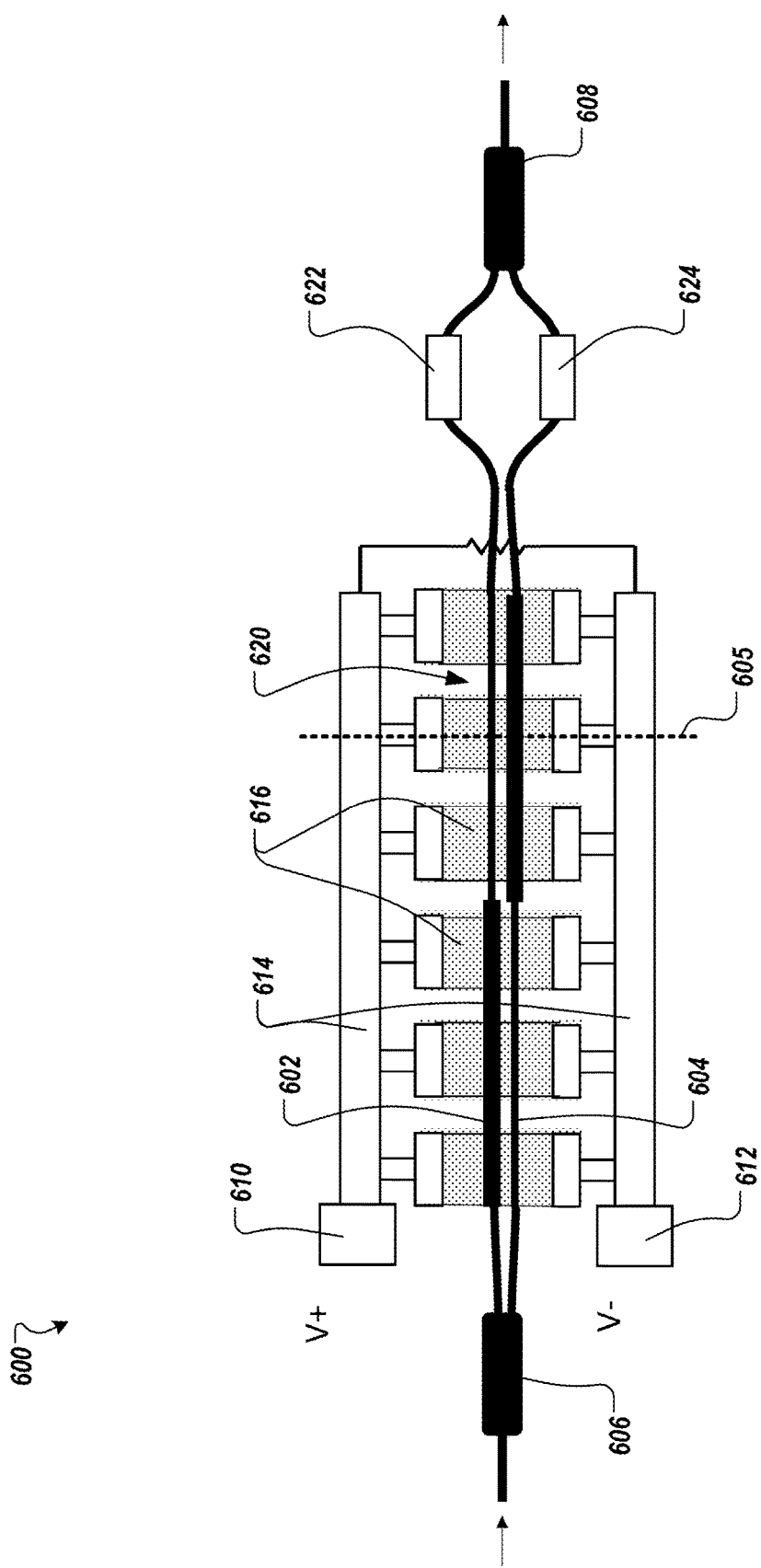
FIG. 6 illustrates another example of a top view of a modulator, according to implementations of the present disclosure.

FIG. 6 illustrates another example of a top view of a modulator 600 according to implementations of the present disclosure. The modulator 600 is an example of an implementation of a segmented traveling-wave structure.

The modulator 600 is also based on an MZI implementation which includes two optical transmission paths 602 and 604, optical splitter 606, and optical combiner 608. The modulator 600 further includes terminals, such as terminal 610 and terminal 612, through which voltages can be applied. The voltages travel along RF transmission line 614, which is connected to a semiconducting structure 616 via electrodes that apply respective voltages, and resulting electric fields, across one or both of the optical transmission paths 602 and 604. The modulator 600 also does not implement any DC bias connection between the two optical transmission paths 602 and 604, which reduces the distance therebetween. For example, in some implementations, the distance between the waveguides of the two optical transmission paths 602 and 604 is less than 0.5 µm for at least a portion of the longitudinal direction of the optical transmission paths 602 and 604. In some implementations, the distance between the waveguides is less than 2.0 µm for at least a portion of the longitudinal direction of the optical transmission paths 602 and 604. In some implementations, the distance between the waveguides is within a range of 0.1 µm to 2.0 µm for at least a portion of the longitudinal direction of the optical transmission paths 602 and 604. In some implementations, the distance between the waveguides is defined as the distance between the inner sidewalls of the two waveguides, at a given point along a longitudinal direction of the modulator 600 (e.g., at a point 605 in FIG. 6).

The differences between modulator 500 of FIG. 5 and modulator 600 of FIG. 6 arise from the configuration of the semiconducting structure (516, 616) and the manner in which the RF transmission line (514, 614) is connected to the semiconducting structure (516, 616). Modulator 500 of FIG. 5 implements a continuous traveling wave structure in which RF transmission line 514 is continuously directly connected to the semiconducting structure 516. By contrast, modulator 600 of FIG. 6 implements a segmented traveling wave structure in which RF transmission line 614 is intermittently connected to segments of the semiconducting structure 616, with intermittent regions 620 along the optical transmission paths 602 and 604 in which there is no semiconducting structure. This structure of modulator 600 can also be referred to as a capacitively loaded traveling wave structure, and has an advantage of providing an additional degree of freedom in implementing the RF transmission 614, e.g., of the average capacitance per unit length of the RF transmission line 614. A lumped-element modulator can also benefit from the techniques disclosed herein.

Furthermore, in modulator 600, the waveguides of optical transmission paths 602 and 604 have different widths in different sections of the modulator 600, similar to the configuration of the waveguides in modulator 500 of FIG. 5. Further details of the width variation of the waveguides are provided with reference to FIG. 7, below.

Figure 7:
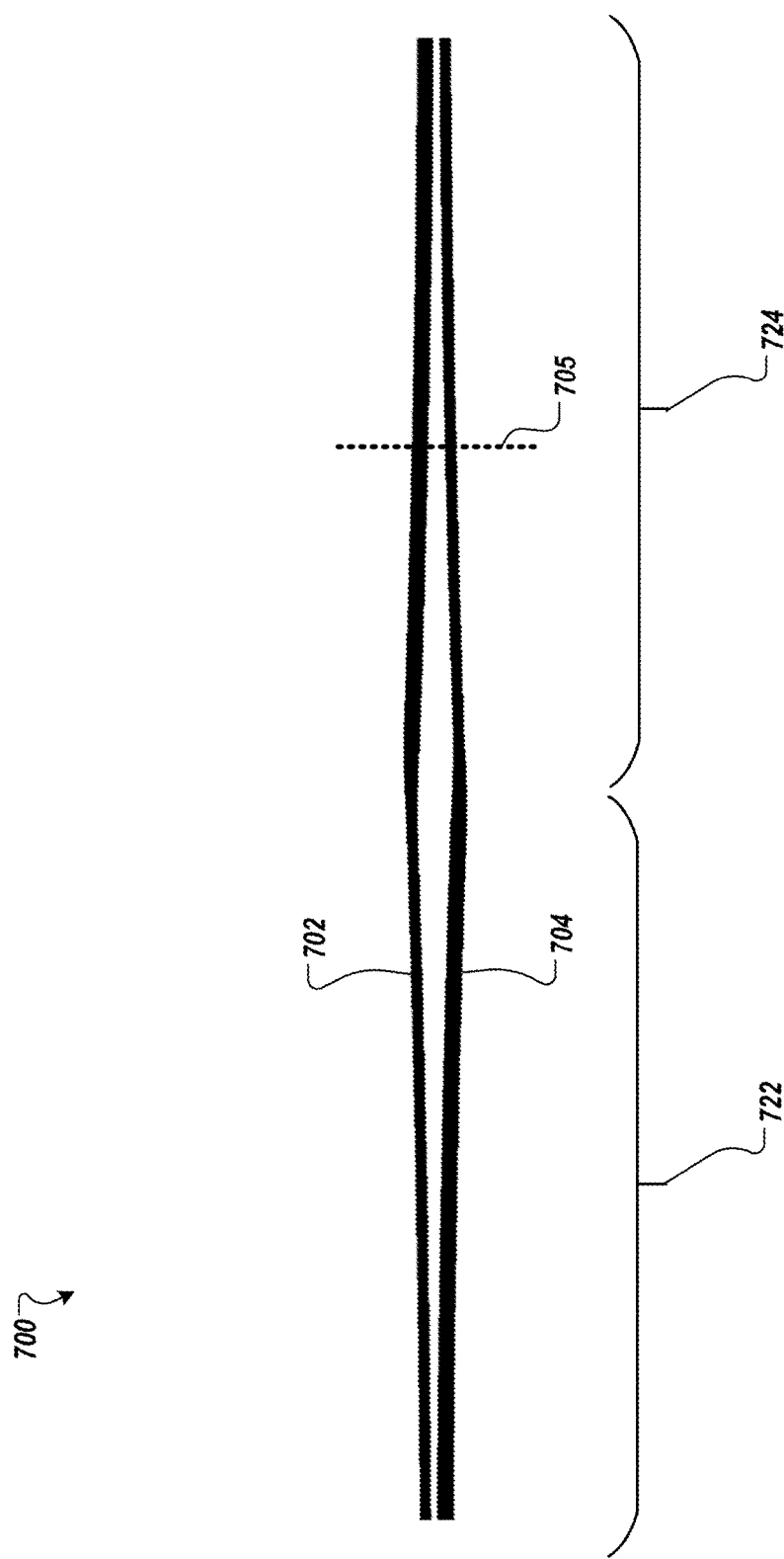
FIG. 7 illustrates an example of a top view of modulator showing width variations of optical waveguides, according to implementations of the present disclosure.

FIG. 7 illustrates an example of a top view of a width-exchange region of modulator 700 showing width variations of optical waveguides, according to implementations of the present disclosure (e.g., modulator 500 of FIG. 5 or modulator 600 of FIG. 6). In some implementations, the width-exchange region is implemented between the semiconducting regions 616 of FIG. 6.

The modulator 700 includes two optical transmission paths 702 and 704, which can be implemented by silicon ribbed waveguides. Furthermore, as discussed with reference to FIGS. 5 and 6, above, modulator 700 does not implement any DC bias connection, thus enabling the two optical transmission paths 702 and 704 to be more closely-spaced together, thus reducing electrical series resistance therebetween.

To mitigate detrimental optical coupling between the more closely-spaced waveguides of the optical transmission paths 702 and 704, one of the optical transmission paths 702 or 704 has a waveguide of a larger width than the waveguide the other optical transmission path. This helps ensure that light traveling in the waveguides of optical transmission paths 702 and 704 are not phase matched, thus mitigating optical coupling between the two waveguides. For example, in some implementations, the waveguide of one of the optical transmission path 702 or 704 is wider by at least 0.04 μm than the waveguide of the other optical transmission path.

Furthermore, the width variation of the two waveguides may be exchanged along the modulator 700. For example, in FIG. 7, in portion 722 of modulator 500, the waveguide of second optical transmission path 704 is wider than the waveguide of the first optical transmission path 702. Then, in portion 724 of modulator 700, the waveguide of the first optical transmission path 702 is wider than the waveguide of the second optical transmission path 704. In some implementations, the difference in waveguide width is at least 0.04 μm. In some implementations, the waveguide width difference is within a range of 0.04 μm to 0.4 μm.

The example of FIG. 7 shows one width exchange in the middle of modulator 700, but in some implementations, additional width exchanges can be included, e.g., as long as the distance between width exchanges is significantly longer than the beat length between the two eigenmodes in the two waveguides, which is typically 10 μm. This helps mitigate optical coupling between the two waveguides. In some implementations, an odd number of exchanges is preferred, since this will help ensure that the beginning and end transitions cancel each other out.

A potential complication that arises from varying the widths of waveguides in optical transmission paths 702 and 704 is that wider waveguides have higher effective refractive index than narrower waveguides. As a result, the phase of light in the waveguide is affected differently in wider portions of the waveguide as compared to narrower portions of the waveguide. As such, if the two optical transmission paths 702 and 704 have different lengths of wider portions (e.g., if the length of portion 722 is greater than the length of portion 724, or vice versa), then this could result in different inherent phase shifts of light in the two waveguides, e.g., due to wavelength or temperature differences, or different speeds of light in the two waveguides.

To mitigate such complications, the exchanging of widths of the two waveguides can be implemented to ensure that the total length of the wider portions in each waveguide are equal, and also that the total length of the narrower portions in each waveguide are equal. This helps ensure that the total effective path length of optical transmission path 702 is the same as that of optical transmission path 704. As a result, this can help ensure non-zero inherent differential phase shift between light propagating along the two optical transmission paths 702 and 704.

In some implementations, the width-exchanging transition can be implemented in a gradual manner. For example, from left to right in FIG. 7, the distance between the waveguides of the two optical transmission paths 702 and 704 is gradually increased. This helps ensure that light in the two optical transmission paths 702 and 704 remains largely uncoupled. With this increased separation, the widths of each waveguide is changed, such that the wider waveguide becomes narrower and the narrower waveguide becomes wider. Once the waveguides have exchanged widths, then the two waveguides are gradually brought closer together again.

In some implementations, the distance between the waveguides of the two optical transmission paths 702 and 704 is less than 0.5 μm for at least a portion of the longitudinal direction of the optical transmission paths 702 and 704. In some implementations, the distance between the waveguides is less than 2.0 μm for at least a portion of the longitudinal direction of the optical transmission paths 702 and 704. In some implementations, the distance between the waveguides is within a range of 0.1 μm to 2.0 μm for at least a portion of the longitudinal direction of the optical transmission paths 702 and 704. In some implementations, the distance between the waveguides is defined as the distance between the inner sidewalls of the two waveguides, at a given point along a longitudinal direction of the modulator 700 (e.g., at a point 705 in FIG. 7).

Figure 8:
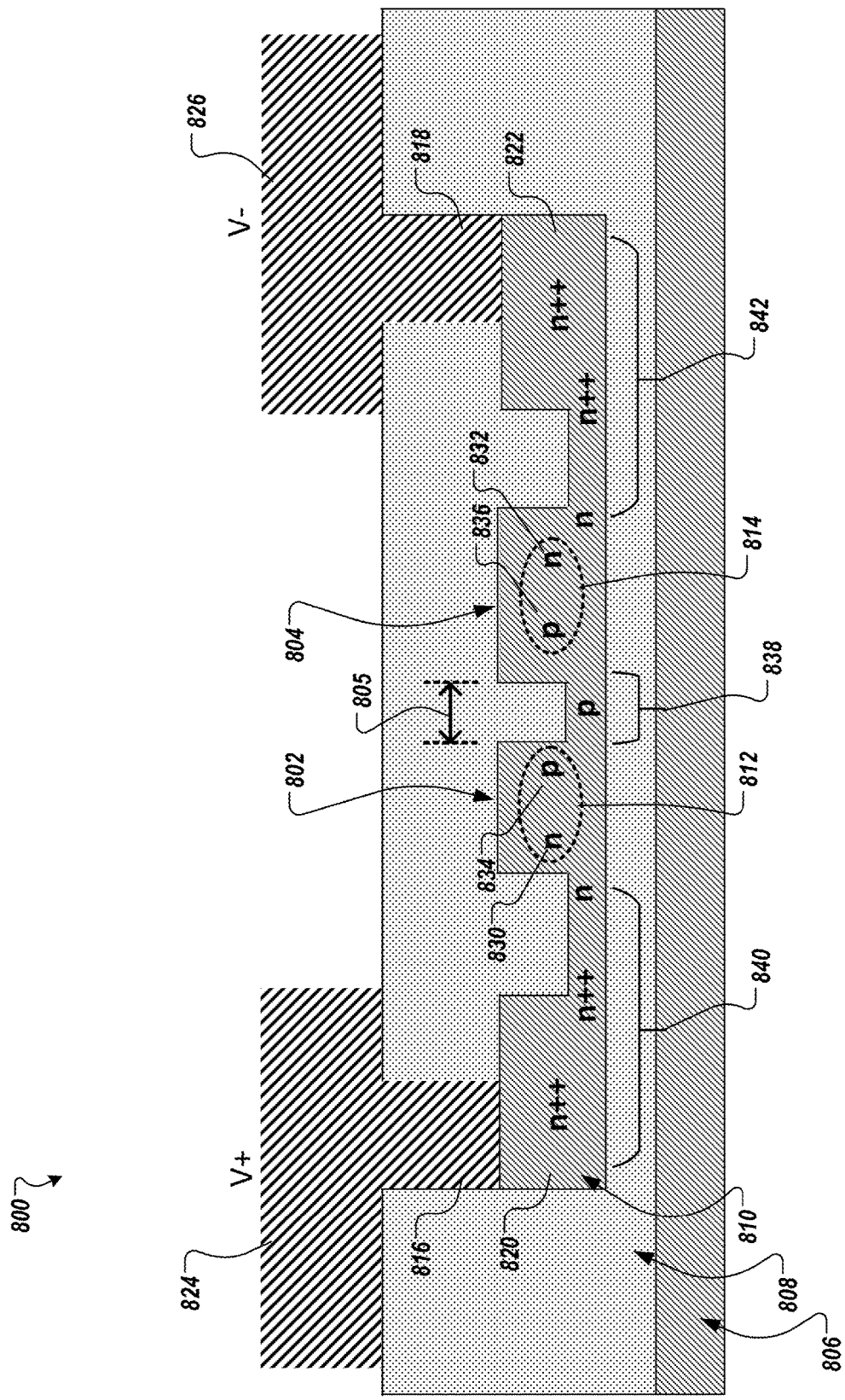
FIG. 8 illustrates an example of a cross section of a modulator, according to implementations of the present disclosure.

FIG. 8 illustrates an example of a cross section of a modulator 800 according to implementations of the present disclosure (e.g., a cross section at point 505 of modulator 500 of FIG. 5 or a cross at point 605 of modulator 600 of FIG. 6).

The cross-section of modulator 800 shows details of the MZI structure. The MZI includes a first optical waveguide 802 and a second optical waveguide 804. The optical waveguides 802 and 804 can be implemented, for example, as silicon ribbed waveguides on top of a slab. In some implementations, the modulator 800 includes a substrate 806 (e.g., a silicon substrate) an insulating structure 808 (e.g., a dielectric, such as an oxide), and a semiconducting structure 810 (e.g., a silicon layer which includes optical waveguides 802 and 804).

In some implementations, as discussed in regards to FIGS. 5-7, above, one of the optical waveguides 802 and 804 is wider than the other optical waveguide. For example, in FIG. 8, the second optical waveguide 804 is wider by at least 0.04 μm than the first optical waveguide 802. In some implementations, the waveguide width difference is within a range of 0.04 μm to 0.4 μm.

Each of the optical waveguides 802 and 804 includes a semiconductor junction. The semiconductor junction diodes can be implemented, for example, by a PIN (P-type/intrinsic/N-type) junction diode or a P/N junction diode. In modulator 800, a P/N junction is implanted into each of the optical waveguides 802 and 804, forming a diode in each waveguide. These diodes are shown as first semiconductor junction diode 812 and second semiconductor junction diode 814.

The modulator 800 also includes electrodes 816 and 818 (e.g., metal electrodes) which are in physical contact with the silicon layer 810. In some implementations, the electrodes 816 and 818 are in physical contact with N-doped contact regions 820 and 822 of the silicon layer 810. The electrodes 816 and 818 may be formed, for example, by etching the insulator layer 808 and forming metal (e.g., tungsten, copper, and/or aluminum) contacts. The modulator 800 may also include metal layers 824 and 826 on top of the electrodes 816 and 818. In some implementations, the metal layers 824 and 826 may form segments of an RF transmission line (e.g., RF transmission line 114 in FIG. 1).

There are numerous differences between modulator 800 and modulator 200 of FIG. 2. Most notably, modulator 800 does not implement any DC bias voltage connection between semiconductor junction diodes 812 and 814 (as compared to modulator 200 which implements DC bias connection 228). Instead, the semiconductor junction diodes 812 and 814 are connected in series with opposite polarity (with anodes 834 and 836 connected together). This ensures that a continuous current can never flow through the semiconductor junction diodes 812 and 814. This configuration enables the voltages across the two semiconductor junction diodes 812 and 814 to naturally self-adjust to ensure that the diodes 812 and 814 remain reverse-biased, despite variations in modulation voltages (e.g., V+ and V−) that may be applied at electrodes 816 and 818. Implementing a floating voltage between the semiconductor junction diodes 812 and 814 automatically biases the diodes 812 and 814 at the most efficient point of the modulator in terms of phase shift per volt, which is where the diodes 812 and 814 are just below turn-on. In some implementations, this phase shift per volt is the "gain" of the modulator.

Another difference between modulator 800 and modulator 200 of FIG. 2 is that the polarities of semiconductor junction diodes 812 and 814 are flipped, as compared with modulator 200. In particular, semiconductor junction diodes 812 and 814 have their respective (P-doped) anodes 834 and 836 closer to the center of modulator 800, and their respective (N-doped) cathodes 830 and 832 closer to the edges of modulator 800. As such, the semiconducting region 838 between the semiconductor junction diodes 812 and 814 is P-doped, while semiconducting regions 840 and 842 (connecting each of semiconductor junction diodes 812 and 814 with their respective electrodes 816 and 818) are N-doped.

These aforementioned differences provide numerous technical advantages for modulator 800, as compared to modulator 200 of FIG. 2. One advantage is that the absence of a DC bias voltage connection in modulator 800 enables the two optical waveguides 802 and 804 to be implemented significantly closer to each other, as compared to modulator 200 of FIG. 2. This enables significant reduction in the size of semiconducting region 838 connecting semiconductor junction diodes 812 and 814, which significantly reduces the electrical series resistance between semiconductor junction diodes 812 and 814. For example, in some implementations, the distance (denoted as 805 in FIG. 8) between the two optical waveguides 802 and 804 is less than 0.5 µm. In some implementations, the distance 805 between the two optical waveguides 802 and 804 is less than 2.0 µm. In some implementations, the distance 805 between the two optical waveguides 802 and 804 is within a range of 0.1 µm to 2.0 µm. In some implementations, the distance 805 between waveguides may be defined as the distance between the inner sidewalls of the two waveguides, at a given point along the longitudinal direction of the modulator 800 (e.g., measured at a cross section of the modulator 800 as shown in FIG. 8).

Another advantage is that, since P-doped silicon has a higher resistivity than N-doped silicon (for the same optical absorption), higher-resistivity P-doped material is used in the smaller semiconducting region 838 (between semiconductor junction diodes 812 and 814), and lower-resistivity N-doped material is used in the larger semiconducting regions 840 and 842 (connecting semiconductor junction diodes 812 and 814 with electrodes 816 and 818). Alternatively, in some implementations, N-doped material can be used in the smaller semiconducting region 838, and P-doped material can be used in the larger semiconducting regions 840 and 842.

As a result, the total series resistance between the electrodes 816 and 818 is significantly reduced, thus significantly improving bandwidth and speed of the modulation.

Although the lack of a DC bias voltage connection in modulator 800 takes away a degree of freedom in the ability to adjust the amount of reverse bias in semiconductor junction diodes 812 and 814, such limitations are, in some scenarios, outweighed by the significant benefits offered by the configuration of modulator 800, such as improved bandwidth and speed of modulation.

Figure 9:
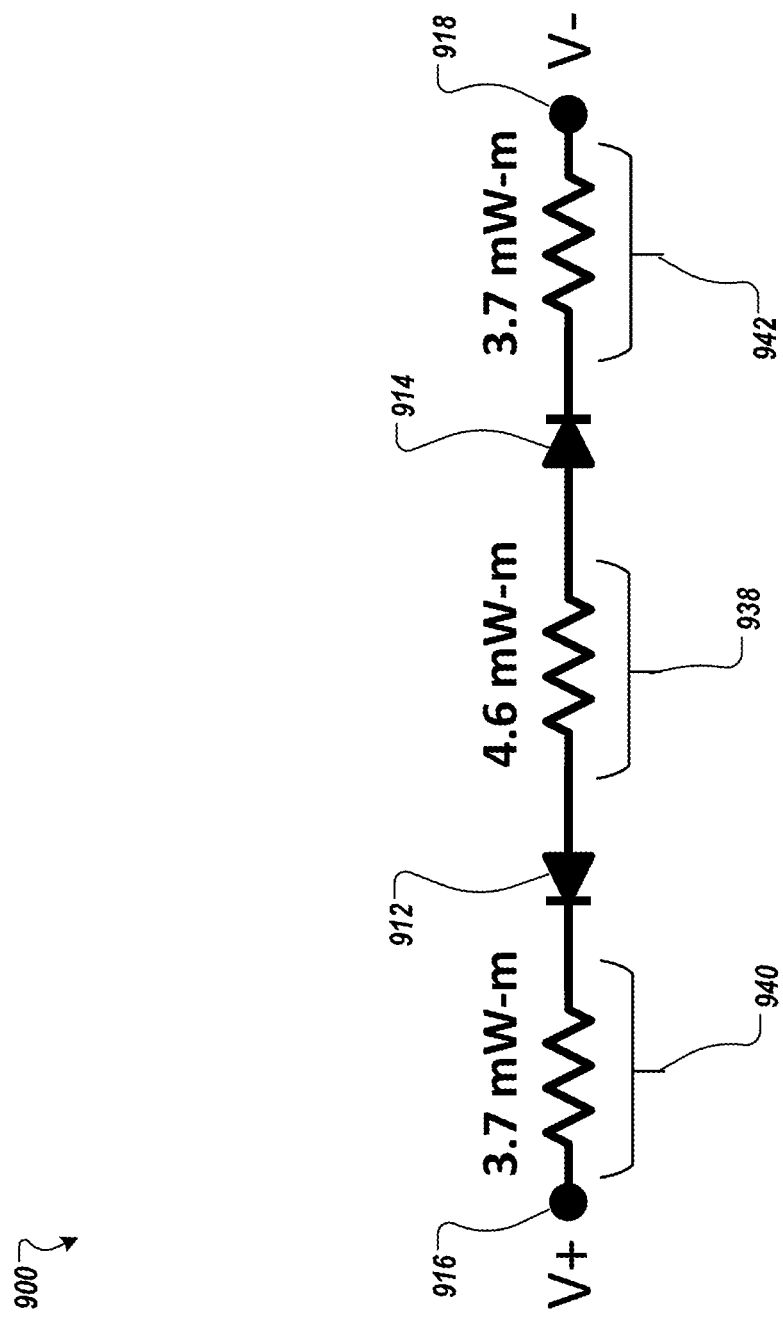
FIG. 9 illustrates an example of an equivalent circuit along a cross-section of a modulator, according to implementations of the present disclosure.

FIG. 9 illustrates an example equivalent circuit 900 along a cross-section of a modulator according to implementations of the present disclosure (e.g., the cross section of modulator 800 of FIG. 8).

In the example of FIG. 9, the electrical series resistance 940 between first electrode 916 and first semiconductor junction diode 912 (e.g., corresponding to semiconducting region 840 in FIG. 8) is 3.7 mΩ-m. The electrical series resistance 942 between second electrode 918 and second semiconductor junction diode 914 (e.g., corresponding to semiconducting region 842 in FIG. 8) is 3.7 mΩ-m. The electrical series resistance 938 between semiconductor junction diodes 912 and 914 (e.g., corresponding to semiconducting region 838 in FIG. 8) is 4.6 mΩ-m (without any DC bias voltage connection between the diodes).

As seen in this example, the total series resistance between electrodes 916 and 918 is reduced by about a factor of two, as compared with the equivalent circuit 300 of FIG. 3. This reduction in total series resistance can significantly improve modulator performance. For example, the modulation bandwidth is increased, by reducing the RF loss along the modulator. Alternatively, modulator efficiency can be improved. For example, a thinner slab can be utilized, which increases total series resistance but also increases optical confinement in the optical waveguides 802 and 804, thus improving modulator efficiency. Alternatively, a thicker waveguide can be utilized, which increases capacitance but also increases optical confinement.

Figure 10:
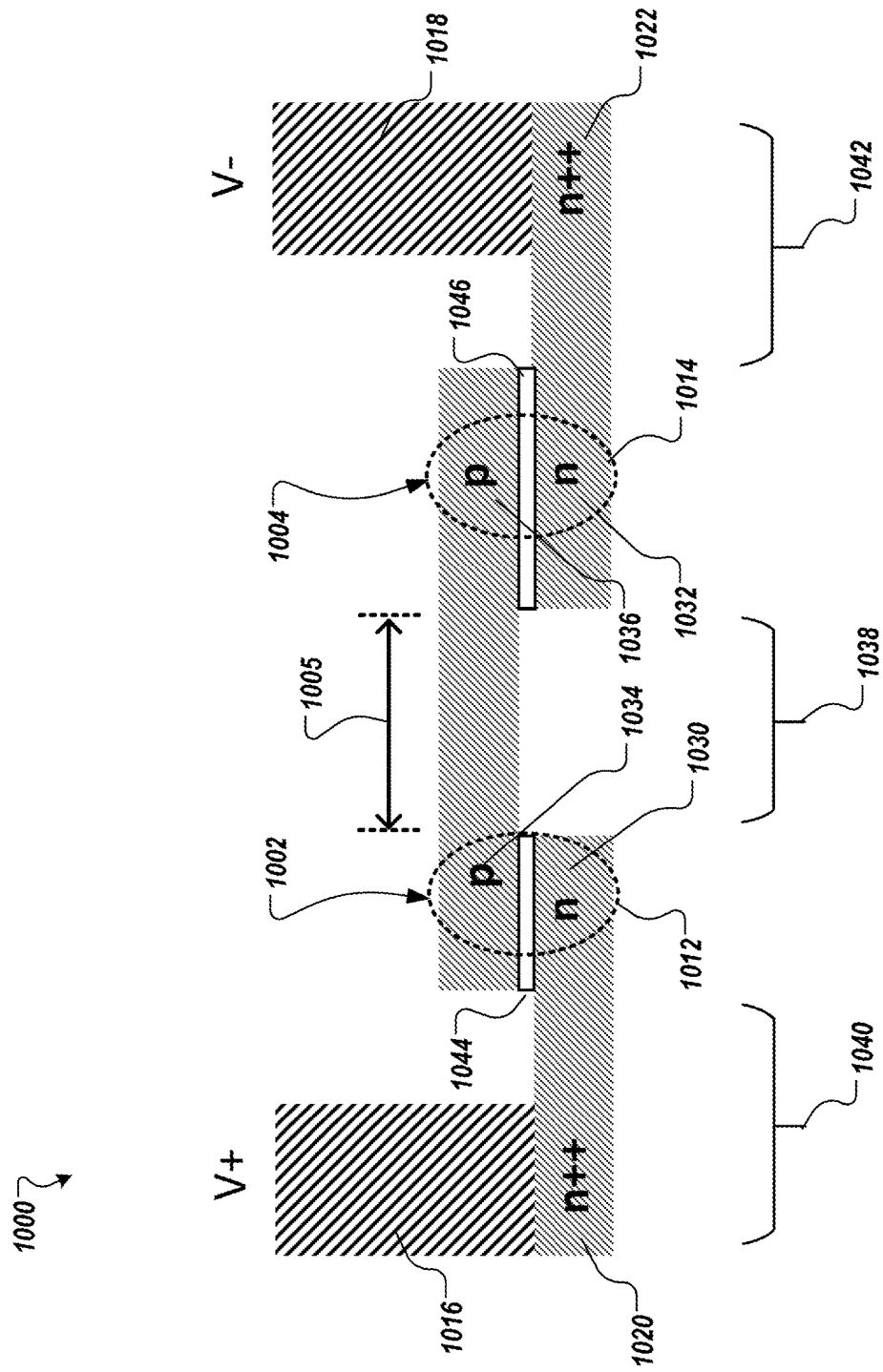
FIG. 10 illustrates another example of a cross section of a modulator, according to implementations of the present disclosure.

FIG. 10 illustrates another example of a cross section of a modulator 1000 according to implementations of the present disclosure (e.g., another example of a cross section of modulator 500 of FIG. 5 or modulator 600 of FIG. 6).

The structure of modulator 1000 is a silicon-insulator-silicon capacitor (SISCAP) modulator structure. As compared with modulator 800 of FIG. 8, the modulator 1000 implements thin oxide layers 1044 and 1046 in the semiconductor junction diodes 1012 and 1014 of optical waveguides 1002 and 1004. Furthermore, as in modulator 800 of FIG. 8, the anodes 1034 and 1036 (P-doped regions) of semiconductor junction diodes 1012 and 1014 are connected together (without a DC bias connection therebetween), and the electrodes 1016 and 1018 apply varying voltages at the cathodes 1030 and 1032 (N-doped regions) of semiconductor junction diodes 1012 and 1014.

These features provide numerous technical advantages for modulator 1000, as compared to modulator 200 of FIG. 2. One advantage is that the absence of a DC bias voltage connection in modulator 1000 enables the two optical waveguides 1002 and 1004 to be implemented significantly closer to each other, as compared to modulator 200 of FIG. 2. This enables significant reduction in the size of semiconducting region 1038 connecting semiconductor junction diodes 1012 and 1014, which significantly reduces the electrical series resistance between semiconductor junction diodes 1012 and 1014. Another advantage is that higher-resistivity P-doped material is used in the smaller semiconducting region 1038 (between semiconductor junction diodes 1012 and 1014), and lower-resistivity N-doped material is used in the larger semiconducting regions 1040 and 1042 (connecting semiconductor junction diodes 1012 and 1014 with electrodes 1016 and 1018). As a result, the total series resistance between the electrodes 1016 and 1018 is significantly reduced, thus significantly improving bandwidth and speed of the modulation. For example, in some implementations, the distance (denoted as 1005 in FIG. 10) between the two optical waveguides 1002 and 1004 is less than 0.5 µm. In some implementations, the distance 1005 between the two optical waveguides 1002 and 1004 is less than 2.0 µm. In some implementations, the distance 1005 between the two optical waveguides 1002 and 1004 is within a range of 0.1 µm to 2.0 µm. In some implementations, the distance 1005 between waveguides may be defined as the distance between the inner sidewalls of the two waveguides, at a given point along the longitudinal direction of the modulator 1000 (e.g., measured at a cross section of the modulator 1000 as shown in FIG. 10).

Furthermore, in some implementations, as discussed in regards to FIGS. 5-8, above, one of the optical waveguides 1002 and 1004 is wider than the other optical waveguide. For example, in FIG. 10, the second optical waveguide 1004 is wider by at least 0.04 µm than the first optical waveguide 1002. In some implementations, the waveguide width difference is within a range of 0.04 µm to 0.4 µm.

The modulators according to implementations of the present disclosure can be used in many applications. For example, one application is a high-speed optical intensity modulator to generate intensity-modulated direct-detection (IM-DD) formats such as non-return-to-zero (NRZ) or pulse amplitude modulation (PAM). Another application is to use the modulator in conjunction with a second modulator with a 90-degree relative phase shift as part of a larger interferometer to generate more complex modulation formats for coherent detection, such as quadrature phase-shift keying (QPSK) modulation or quadrature amplitude modulation (QAM). For example, this can be achieved by an in-phase/quadrature (IQ) modulator structure that includes nested modulators, with each of the two branches of a modulator (the outer modulator) implementing another modulator (the inner modulators). In some implementations, phase shifters can be implemented that set 180-degree and 90-degree phase differences for the inner and outer modulators, respectively. Each modulator in such a nested modulator structure can be implemented as described in the present disclosure (e.g., implemented as a modulator described with reference to FIGS. 5-10).

Figure 11:
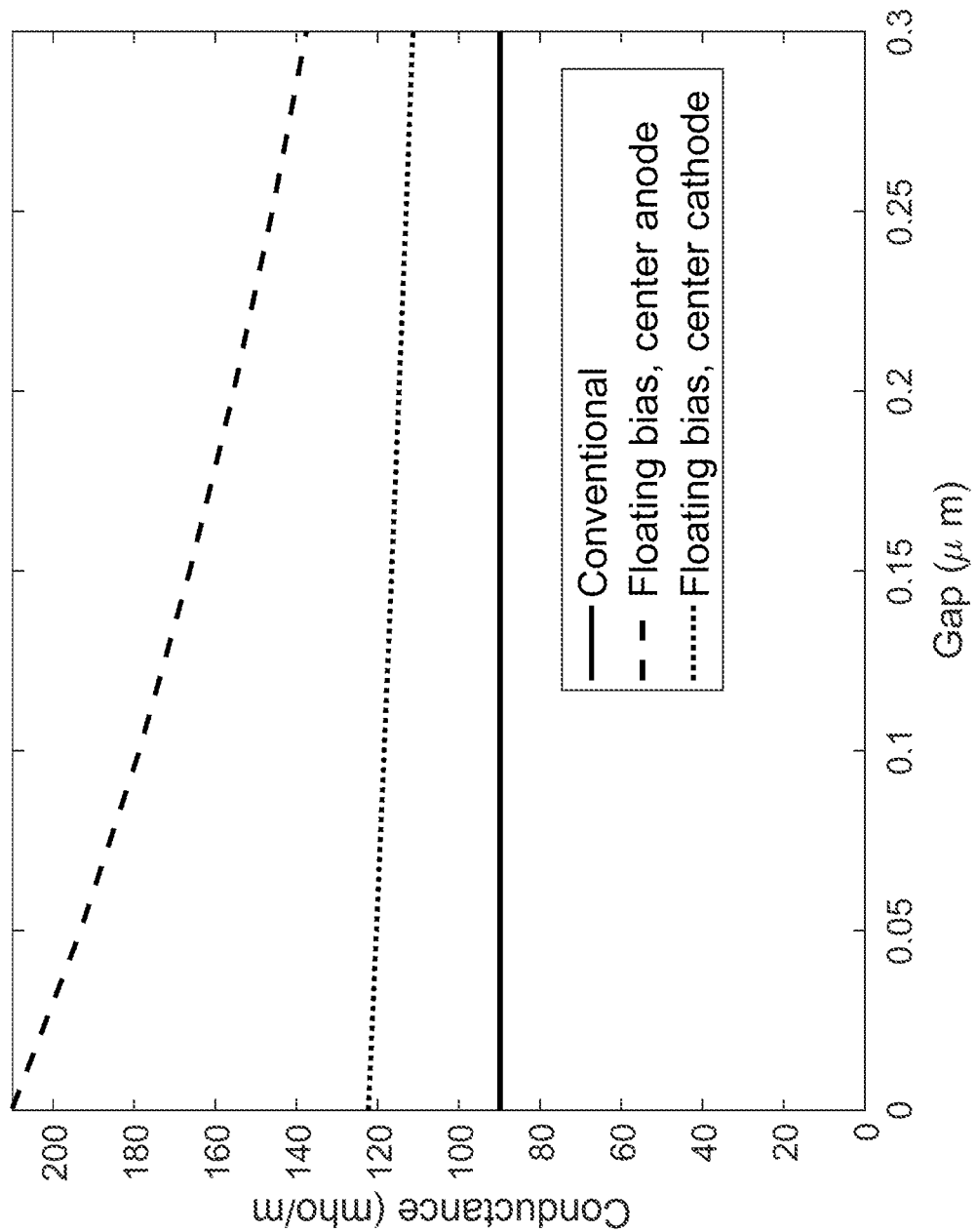
FIG. 11 illustrates an example of performances of different modulators, in terms of conductance per unit length between the V+ and V− terminals as a function of distance between the waveguides.

FIG. 11 illustrates an example of the performances of different modulators, in terms of conductance per unit length between the V+ and V− terminals as a function of distance between the waveguides.

The plots shown in FIG. 11 compare the performance of a modulator with a DC bias connection (e.g., modulator 100 of FIG. 1) with the performance of a modulator with a floating anode implementation (e.g., the modulators of FIGS. 5-10), and a modulator with a floating cathode implementation, for typical semiconductor doping levels. As shown in FIG. 11, if the distance between the waveguides is 0.1 µm, then the floating anode implementation doubles the conductance, as compared to the DC bias connection implementation. The floating cathode implementation also provides an improvement over the DC bias connection implementation, although significantly smaller due to the predominance of the P-doped regions in the semiconducting structure of the modulator.

Figure 12:
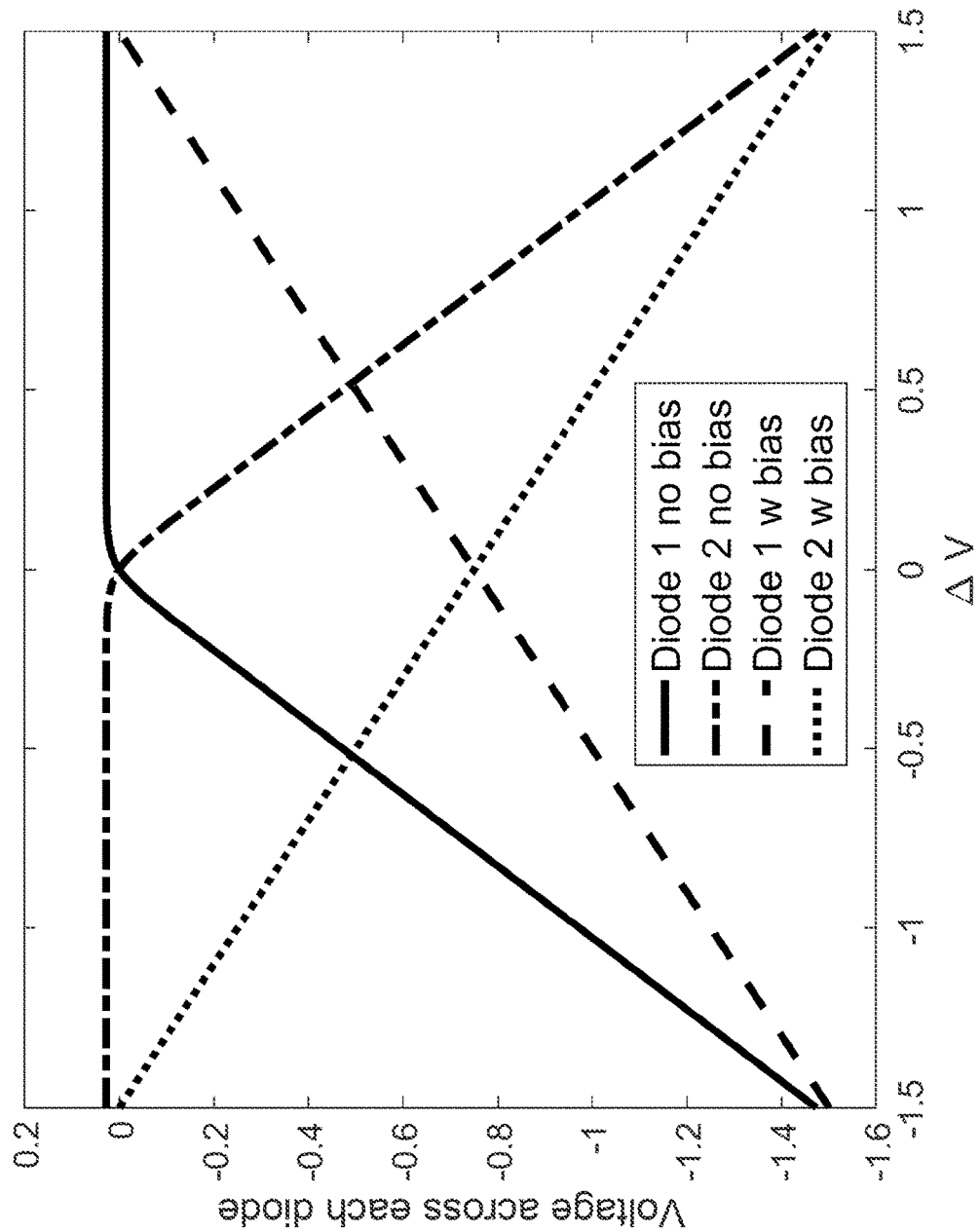
FIG. 12 illustrates an example of performances of different modulators, in terms of voltage across each semiconductor junction diode as a function of applied differential voltage $\Delta V$ across the two terminals of the modulator.

FIG. 12 illustrates an example of the performances of different modulators, in terms of voltage across each semiconductor junction diode as a function of applied differential voltage $\Delta V$ across the two terminals of the modulator, where $\Delta V = V+ - V-$, which is the voltage across the two diodes in series in FIGS. 3 and 9.

The curves with dotted lines represent the voltages across each of the two diodes of a modulator with a DC bias connection (e.g., modulator 100 of FIG. 1), and the curves with solid lines represent the voltages across each of the two diodes of a modulator with a floating anode implementation (e.g., the modulators of FIGS. 5-10).

For the curves with dotted lines (a modulator with a DC bias connection, e.g., modulator 100 of FIG. 1), the bias voltage is adjusted so that the diodes remain below the diode turn-on voltage. For these curves, the voltage across each diode is approximately linear with a magnitude of slope equal to approximately ½ (i.e., +½ and −½ for the two dotted-line curves).

For the curves with solid lines (a modulator with a floating anode implementation, e.g., the modulators of FIGS. 5-10), when the differential applied voltage $\Delta V$ is equal to zero, the voltage across each diode is also zero, such that curves for the two diodes intersect at point (0, 0) of the graph. If the applied differential voltage $\Delta V$ is large, then one diode is just below turn-on, and the other diode has a large reverse voltage. This allows the modulator to operate at the highest possible gain automatically, despite environmental or fabrication process changes. The solid-line curves for both diodes initially transition with slopes of magnitude 1 (i.e., +1 and −1 for the sloped portions of the two solid-line curves). The overall result is a nonlinear behavior of voltage across each diode as a function of applied differential voltage $\Delta V$. The difference of the voltages across the two diodes is strictly proportional to the applied differential voltage $\Delta V$ in both cases, but the MZI configuration of the modulator is no longer driven with equal and opposite sign in each optical transmission path. This will introduce a small nonlinear chirp on the resulting optical signal that is output from the optical combiner, which may impact transmission in the presence of chromatic dispersion. However, this effect should be very small.

Figure 13:
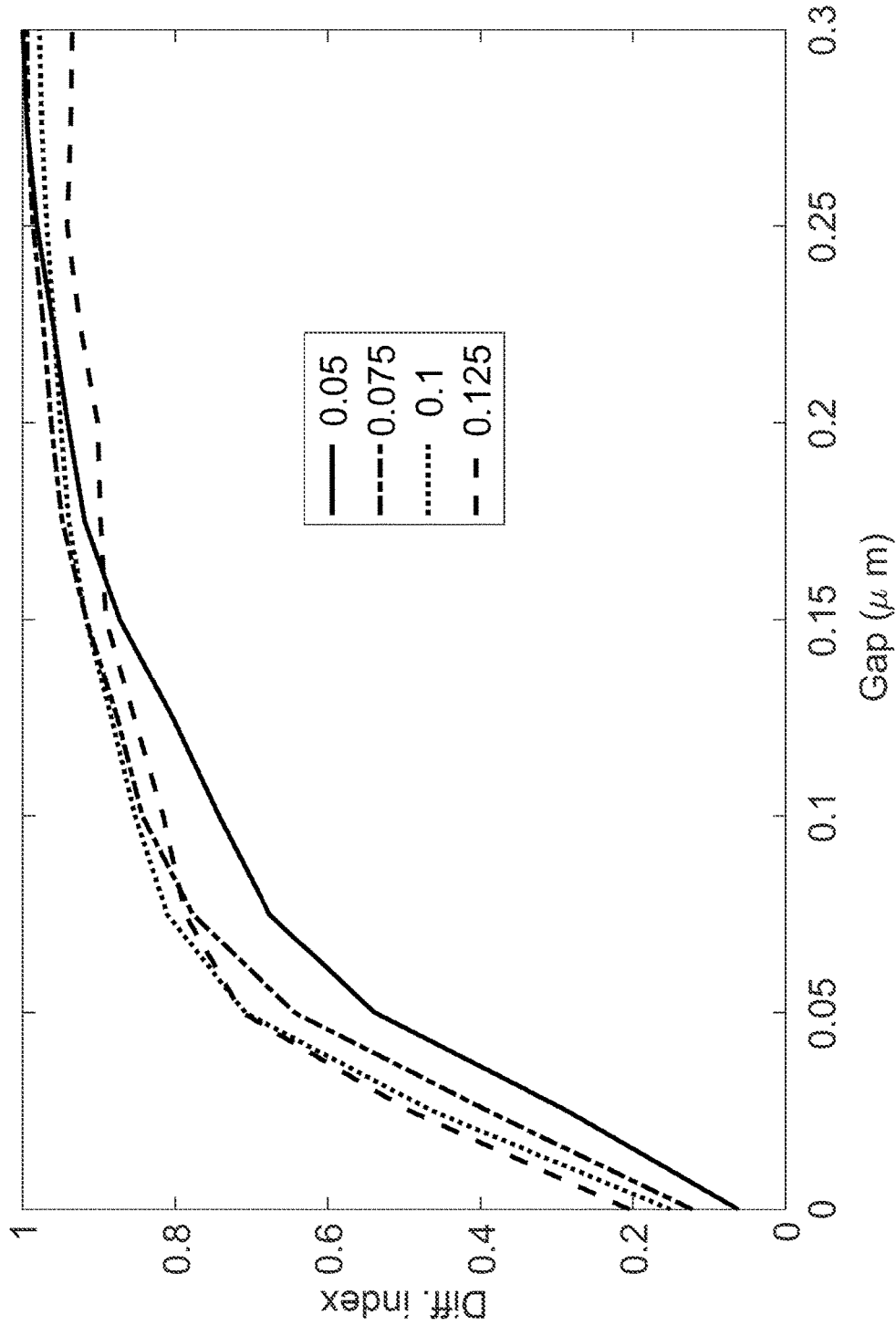
FIG. 13 illustrates an example of the performances of modulators according to implementations of the present disclosure, in terms of normalized differential refractive index change between the two waveguides of the modulator, as a function of distance between the waveguides, for various waveguide widths.

FIG. 13 illustrates an example of the performances of modulators according to implementations of the present disclosure (e.g., the modulators of FIGS. 5-10), in terms of normalized differential refractive index change between the two waveguides of the modulator, as a function of distance between the waveguides, for various waveguide widths.

In the example of FIG. 13, the nominal waveguide width is 0.45 µm, and the wavelength is 1.31 µm. The waveguide thickness is 0.22 µm, and the slab thickness is 0.10 µm. The results of FIG. 13 were generated by simulating a depletion zone in the center of each waveguide, with the size of the depletion zone having width 0.2 µm and height 0.22 µm. The depletion zone is increased in refractive index by $3 \times 10^{-4}$ in one waveguide and decreased in refractive index by $3 \times 10^{-4}$ in the other waveguide, and the refractive indices of the two waveguide modes are calculated. The sign of the refractive index change is changed, and the refractive indices of the two waveguide modes are calculated again. The mode refractive indices for the two cases are subtracted and averaged for the two waveguides, and the result is normalized to the largest value, to yield the differential index in the plots of FIG. 13.

Figure 14:
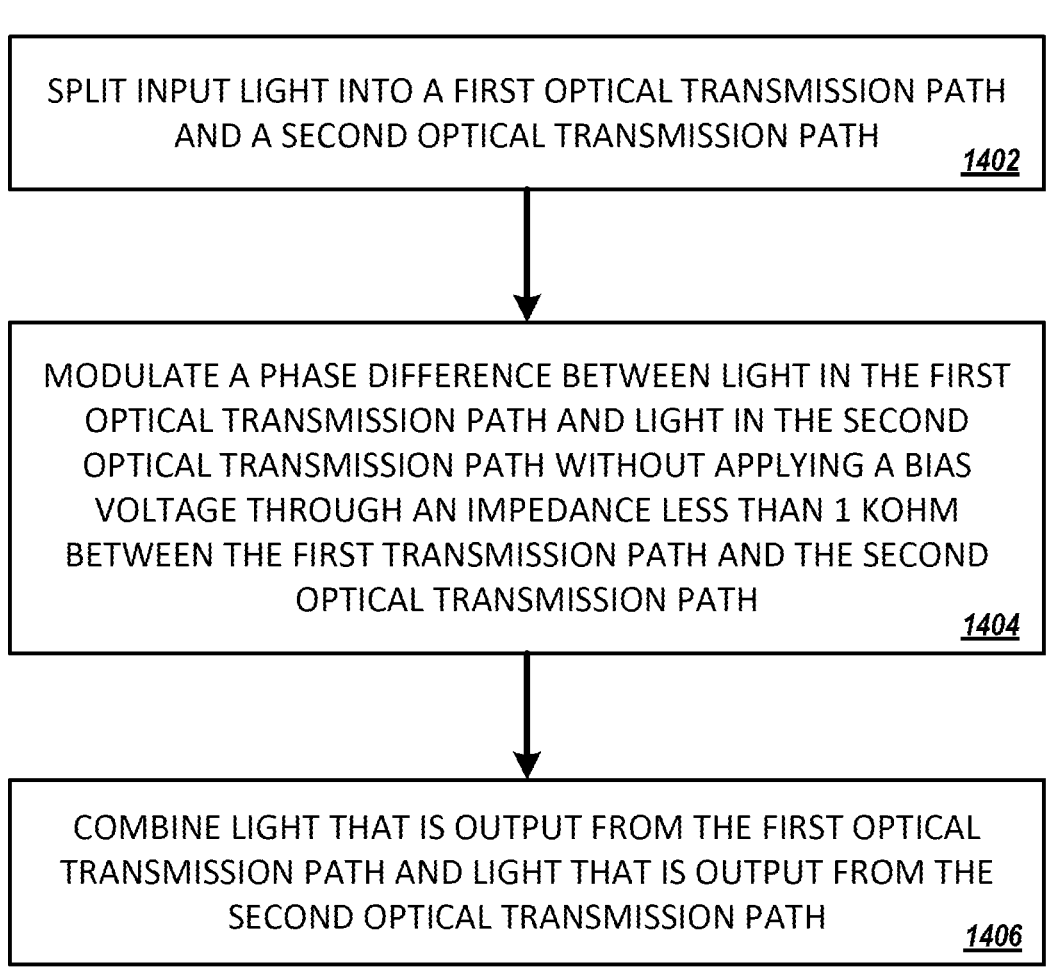
FIG. 14 is a flowchart illustrating an example of modulating an optical signal, according to implementations of the present disclosure.

FIG. 14 is a flowchart illustrating an example method 1400 of modulating an optical signal, according to implementations of the present disclosure. The method 1400 may be performed by using a modulator as disclosed herein (e.g., a modulator as described with reference to FIGS. 5-10).

The method 1400 includes splitting input light into a first optical transmission path and a second optical transmission path (1402).

The method 1400 further includes modulating a phase difference between light in the first optical transmission path and light in the second optical transmission path without applying a bias voltage between the first optical transmission path and the second optical transmission path (1404). In some implementations, the phase difference between the light in the first optical transmission path and the light in the second optical transmission path is modulated while maintaining finite depletion regions in semiconductor junction diodes in each of the first optical transmission path and the second optical transmission path. For example, this modulation can be performed using the floating anode structure of modulators discussed above with reference to FIGS. 5-10.

The method 1400 further includes combining light that is output from the first optical transmission path and light that is output from the second optical transmission path (1406).

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. An optical modulator comprising:
 a Mach-Zehnder interferometer comprising (i) a first optical waveguide comprising a first semiconductor junction diode, and (ii) a second optical waveguide comprising a second semiconductor junction diode; and
 a semiconductor region that connects the first semiconductor junction diode with the second semiconductor junction diode such that a distance between the first optical waveguide and the second optical waveguide is less than 2.0 µm for at least a portion of a longitudinal direction of the optical modulator.

2. The optical modulator of claim 1, wherein the first semiconductor junction diode comprises a first anode and a first cathode,
 wherein the second semiconductor junction diode comprises a second anode and a second cathode, and
 wherein the first anode is connected to the second anode through the semiconductor region that spans the distance between the first optical waveguide and the second optical waveguide.

3. The optical modulator of claim 2, wherein the semiconductor region between the first anode and the second anode is configured without any external voltage connection that has an impedance less than 100 ohm.

4. The optical modulator of claim 2, further comprising:
 a first electrode connected to the first cathode and configured to apply a first electric field to the first optical waveguide; and
 a second electrode connected to the second cathode and configured to apply a second electric field to the second optical waveguide.

5. The optical modulator of claim 2, further comprising:
 a radio frequency (RF) transmission line configured to apply (i) a first voltage to the first cathode through a first electrode, and (ii) a second voltage to the second cathode through a second electrode.

6. The optical modulator of claim 5, wherein the first optical waveguide comprises a plurality of first semiconductor junction diodes,
 wherein the second optical waveguide comprises a plurality of second semiconductor junction diodes, and
 wherein the RF transmission line is configured to (i) apply the first voltage to the plurality of first semiconductor junction diodes through a plurality of first electrodes, and (ii) apply the second voltage to the plurality of second semiconductor junction diodes through a plurality of second electrodes.

7. The optical modulator of claim 1, wherein for a first portion of the optical modulator, the first optical waveguide is wider by at least 0.04 µm than the second optical waveguide, and
 wherein for a second portion of the optical modulator, the second optical waveguide is wider by at least 0.04 µm than the first optical waveguide.

8. The optical modulator of claim 1, wherein for at least a portion of the optical modulator:
 the first optical waveguide increases in width along the longitudinal direction of the optical modulator, and
 the second optical waveguide decreases in width along the longitudinal direction of the optical modulator.

9. The optical modulator of claim 1, wherein the first semiconductor junction diode comprises a first p-doped region and a first n-doped region, and
 wherein the second semiconductor junction diode comprises a second p-doped region and a second n-doped region.

10. The optical modulator of claim 9, wherein the first p-doped region is connected to the second p-doped region through a third p-doped region in the semiconductor region that connects the first semiconductor junction diode with the second semiconductor junction diode, and
 wherein the third p-doped region is configured without any external voltage connection that has an impedance less than 100 ohm.

11. The optical modulator of claim 9, wherein the first semiconductor junction diode further comprises a first oxide layer between the first p-doped region and the first n-doped region, and
 wherein the second semiconductor junction diode further comprises a second oxide layer between the second p-doped region and the second n-doped region.

12. The optical modulator of claim 1, wherein the Mach-Zehnder interferometer further comprises:

an optical splitter configured to receive input light and split the input light into the first optical waveguide and the second optical waveguide; and an optical combiner configured to receive first output light from the first optical waveguide and second output light from the second optical waveguide, and combine the first output light with the second output light.

13. An optical modulator comprising:

an optical splitter configured to split an input light into a first optical transmission path and a second optical transmission path;

means for modulating a phase difference between light in the first optical transmission path and light in the second optical transmission path without applying a bias voltage through an impedance less than 100 ohm between the first optical transmission path and the second optical transmission path; and an optical combiner configured to combine light that is output from the first optical transmission path and light that is output from the second optical transmission path.

14. The optical modulator of claim 13, further comprising:

a radio-frequency (RF) transmission line configured to apply (i) a first voltage to the first optical transmission path through a first electrode, and (ii) a second voltage to the second optical transmission path through a second electrode.

15. The optical modulator of claim 13, wherein:

the first optical transmission path comprises a first semiconductor junction diode, the second optical transmission path comprises a second semiconductor junction diode, and the first semiconductor junction diode is just below turn-on while the second semiconductor junction diode is at maximum reverse voltage during modulation.

16. The optical modulator of claim 13, wherein the phase difference between the light in the first optical transmission path and the light in the second optical transmission path is modulated by applying a first electric field to the first optical transmission path and a second electric field to the second optical transmission path in push-pull mode.

17. The optical modulator of claim 13, wherein the phase difference between the light in the first optical transmission path and the light in the second optical transmission path is modulated while maintaining finite depletion regions in semiconductor junction diodes in each of the first optical transmission path and the second optical transmission path.

18. A method of modulating an optical signal, the method comprising:

splitting input light into a first optical transmission path and a second optical transmission path;

modulating a phase difference between light in the first optical transmission path and light in the second optical transmission path without applying a bias voltage through an impedance less than 100 ohm between the first optical transmission path and the second optical transmission path; and combining light that is output from the first optical transmission path and light that is output from the second optical transmission path.

19. The method of claim 18, wherein the phase difference between the light in the first optical transmission path and the light in the second optical transmission path is modulated while maintaining finite depletion regions in semiconductor junction diodes in each of the first optical transmission path and the second optical transmission path.

20. An optical modulator comprising:

a Mach-Zehnder interferometer comprising (i) a first optical waveguide comprising a first semiconductor junction diode, and (ii) a second optical waveguide comprising a second semiconductor junction diode; and a semiconductor region that connects a terminal of the first semiconductor junction diode with a terminal of the second semiconductor junction diode, wherein the terminal of the first semiconductor junction diode and the terminal of the second semiconductor junction diode are either both p-doped anodes or both n-doped cathodes, and wherein the semiconductor region is not connected to any other circuit element through an impedance less than 100 ohm.

* * * * *